(12) United States Patent
Lai (10) Patent No.: US 7,627,537 B2
(45) Date of Patent: Dec. 1, 2009

(54) SCORE RESULT REUSE FOR BAYESIAN NETWORK STRUCTURE LEARNING

(75) Inventor: Chunrong Lai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 10/977,861

(22) Filed: Oct. 28, 2004

(65) Prior Publication Data

US 2006/0112057 A1  May 25, 2006

(51) Int. Cl.
  *G06N 5/00* (2006.01)
(52) U.S. Cl. .......................................... 706/12; 706/45
(58) Field of Classification Search .................. 706/12; 382/190, 159; 348/143; 703/2; 704/254; 342/451
See application file for complete search history.

(56) References Cited

U.S. PATENT DOCUMENTS

| | | | | |
|---|---|---|---|---|
| 5,893,058 | A * | 4/1999 | Kosaka | 704/254 |
| 6,058,206 | A * | 5/2000 | Kortge | 382/159 |
| 6,992,625 | B1 * | 1/2006 | Krumm et al. | 342/451 |
| 7,047,169 | B2 * | 5/2006 | Pelikan et al. | 703/2 |
| 2003/0214583 | A1 * | 11/2003 | Sadok | 348/143 |
| 2003/0215141 | A1 * | 11/2003 | Zakrzewski et al. | 382/190 |
| 2003/0215143 | A1 * | 11/2003 | Zakrzewski et al. | 382/190 |
| 2003/0220906 | A1 | 11/2003 | Chickering | |

OTHER PUBLICATIONS

Laura E. Brown et al., "A Novel Algorithm for Scalable and Accurate Bayesian Network Learning", *Proceedings of the 11th World Congress on Medical Informatics (Medinfo)*, Sep. 7-11, 2004, San Francisco, California, 5 pages.
R. Chen et al., "Learning Bayesian Network Structure From Distributed Data", *Proceedings of SIAM International Conference on Data Mining*, 2003, San Francisco, 5 pages.
Wai Lam et al., "A Parallel Learning Algorithm for Bayesian Inference Networks", pp. 1-34. (*IEEE Transactions on Knowledge and Data Engineering*, 2002, vol. 14, No. 1, pp. 93-105).
T. Mitchell, "Bayesian Learning" lecture slides for textbook *Machine Learning*, 1997, pp. 125-174, McGraw Hill.
Ioannis Tsamardinos, Ph.D. et al., "Scaling-Up Bayesian Network Learning to Thousands of Variables Using Local Learning Techniques", *Department of Biomedical Informatics*, Vanderbilt University, Nashville, TN, 5 pages. (DSL TR-03-2, Mar. 12, 2003).
Bowei Xi et al., "A Smart Hill-Climbing Algorithm for Application Server Configuration", *Proceedings International WWW Conference*, May 17-22, 2004, pp. 287-296, New York, USA.

* cited by examiner

*Primary Examiner*—Wilbert L Starks, Jr.
(74) *Attorney, Agent, or Firm*—Blakely, Sokoloff, Taylor & Zafman LLP (57) ABSTRACT

Reuse of intermediate statistical score computations. Learning a network structure may involve computationally intensive operations. In one embodiment a partial result may be computed and cached that will be used in computing the score of another network structure. A speculative determination whether to cache the partial result may be made.

30 Claims, 5 Drawing Sheets

SCORE RESULT REUSE FOR BAYESIAN NETWORK STRUCTURE LEARNING

FIELD

Embodiments of the invention relate to network structure learning, and particularly to speculative computation reuse in Bayesian network structure learning.

BACKGROUND

Large amounts of information, especially related information, may be organized into network structures. A Bayesian network is a common example of such a network structure. The use of Bayesian networks is increasing in bioinformatics, pattern recognition, statistical computing, etc. The learning of a Bayesian network structure is very computation intensive, and the solution for finding a true "optimal" structure may be NP-complete. Even as the learning of Bayesian network structures is very computation intensive, networks with much larger data sets are being explored, which may increase the computational intensity, which may include an exponential increase in computational intensity. Heuristic approaches often focus on improving the performance efficiency of structure learning, for example, execution time. Performance efficiency is increasingly important in providing acceptable solutions to modern networks. Parallel learning approaches have been considered to include the resources of multiple computation machines in performing a structure learning algorithm. Current or traditional approaches, including parallel learning algorithms, may still fail to provide a desired performance for networks of increasing size and complexity.

BRIEF DESCRIPTION OF THE DRAWINGS

The detailed description below includes various illustrations in figures and accompanying drawings by way of example, and not by way of limitation. These figures may be briefly described as follows.

DETAILED DESCRIPTION

The data network structures may organize data into logical relationships between the different elements of data. The data elements may include the states or observations of a node or vertex of the data network structure. The information representing the states or observations may be referred to as an "evidence." One or more evidences may be referred to as training data of a node, and used to compute a relationship between multiple nodes. The logical relationship between nodes/vertices may be represented graphically as an edge, arc, or link, and may include a statistical relationship between state of the nodes. The combination of nodes, each having one or more states, and the edges/arcs/links representing their relationship may be referred to as a directed acyclic graph (DAG). A DAG may be considered to focus on a target node and its relationships to nodes in a neighborhood (its "neighbors") surrounding the target node. A neighbor may be considered a DAG with an edge difference as compared to a current structure (DAG).

The evidences of a node may represent the states of the node. The evidence of a DAG represents the observations of all nodes within the DAG. As each node may be considered to have several states, score computing for a DAG will build a multi-dimensional matrix, with the dimension number being the number of neighbors surrounding a target node in the neighborhood, and the dimension length being the number of states for a corresponding node. The target node (the child), and the neighbor nodes may be referred to as a family. Hill-climbing, or a derivative, is one algorithm commonly used for structure learning and performing the multi-dimensional matrix computations/calculations. Based on known information, or training data, and particular scoring metrics of the algorithm, the algorithm scores a neighborhood.

The neighborhood may be scored by the algorithm changing the neighborhood structure, or node states, by performing an edge difference (e.g., single edge add, delete, reversal), and scoring the resulting structure. The score of a node may be computed based on the training data for the node's states as well as the states of the node's parents (neighbor nodes with edges connected to the target node). The edge difference may result in a state change for one (e.g., the difference is edge add or edge delete) or both nodes between which the edge change occurs, and the score computed from the difference between the new structure and the previous structure. Each node may be calculated to determine its score in relation to the other nodes in an iterative manner, and the score of the DAG summed. When the neighborhood is scored, one DAG structure will have a higher score than other neighbors. The DAG with the highest score will be set as the target node by the algorithm, and the process may be iteratively repeated to determine the score for each node in the DAG. When no neighbors achieve a higher score than the current structure, or when a computation criterion has been reached (e.g., execution time, number of operations), the current structure is output as the final learned structure.

The learning matrix may be trained to start with all element values equal to zero, and proceed to process the evidences one by one. A specific element of the matrix indexing the observed states (evidences) of the nodes in the family may be incremented when the evidences have been processed. Traditional approaches to this structure learning may spend 90% or more of execution time on reading and processing the evidences to fill the learning matrix. In one embodiment computing a node score within a DAG is buffered by a hash-table or score-cache indexed by the node family. Thus, a score for the same family structure may be available and need not be repeatedly computed for the same family. In one embodiment this cached or stored node score may be distributed among the learning matrix. The score may be distributed to multiple parallel computing devices/machines that will perform computations relating to the matrix learning.

The final score of a DAG may be computed as an entropy of the learning matrix, or sum of entropies of the current node given each possible parent value defined by the combination of the node states. Traditional approaches place or lay the target node (child) at the last dimension of the learning matrix to localize the child state values and ease the summing for the states. In one embodiment a family can be divided as several groups with the same child node. The groups may differ by having only one parent node different, for example, by forming groups from adding one different edge to the same node, which adds one different parent to a child, inside one step in a hill climbing approach. This interdependence of families may provide locality of node computations. Based on this locality, an intermediate result of a computed score within the same group may be reused, resulting in a score computation speed-up.

In one embodiment a displacement value may be the intermediate result. A displacement of a multi-dimensional index $(d_1, d_2, \ldots, d_n)$ to a multi-dimensional matrix can be computed as $(\ldots ((d_1*D_1+d_2)*D_2+d_3)*D_3+\ldots)*D_{n-1}+d_n$, where $D_i$ is the dimension length, or state number of the ith node. A displacement calculation may occur late enough in a score computing procedure to provide that reuse of the displacement may prevent repeating one or more computations. Thus, a displacement may be cached and used multiple times, saving execution time. Score computing of two separate nodes may use both $D_i$ and $d_i$ as constants if the nodes for which the scores are being computed have the same ith node. Thus, the value $( \ldots ((d_1*D_1+d_2)*D_2+d_3)*D_3+ \ldots )*D_{n-1}$ may be computed for one node, or pre-computed, and be cached and reloaded for later use by another node. When used as a cached value, the computed displacement value may be referred to as a partial displacement. In this way a new displacement can be computed by adding a $d_n$ with the reloaded partial displacement. The computation time may be minimal in comparison to re-computing the score for the entire node, for example, if the value of $d_n$ may simply be read from the evidences, and the partial displacement value re-loaded.

A computational procedure may be considered to have a logical computation order, in that the computational procedure may calculate the displacement according to a logical ordering of the evidences, states, and/or nodes. For example, the child node may be logically ordered to be the last dimension in the score computation. Thus, the variable $d_n$ representing an observed state of an edge, which is laid in last dimension of the learning matrix, may be associated with the child, placing the child in the last dimension. In one embodiment the order of the computation procedure or computation structure is logically rearranged, reordered, and/or changed. Thus, the variable $d_n$ may be associated with an observed state of a dynamic parent node (i.e., a parent affected by the edge difference), and having the child as the penultimate, or next to last, dimension. Thus, the structure of the learn matrix may be altered to be different than the original organization in that the child node is in the penultimate instead of the last dimension.

An entropy computing algorithm can benefit from locality of the child node, meaning, the learned values corresponding to states of the child node given states of the parent nodes, which may not have been present prior to the rearrangement of the learn matrix computation order. With the child node laid at the penultimate (next to last) dimension, the locality of a searched child state may be maintained in the computing. In one embodiment a "last value" or previously computed prediction scheme is used to provide a locality benefit with high accuracy and low additional overhead. If a computation algorithm is aware of the new layout (rearranged structure/order) of the learn matrix and the partial displacement, for each evidence one partial displacement value may be buffered when a new family group is encountered. The computation of the entire group of families may read and use the partial displacement in the score computing, which may reduce evidence table reading and learn matrix displacement computing effort, for example, if the family of a current score computing matches the family of the previous score computing, with one parent difference. Although speculative buffering may be wasted if a new family encountered does not match the previous family, the efforts saved in cases where the family does match may outweigh the wasted overhead. In one embodiment computation rearrangement may be employed to fit the predicted pattern (e.g., set the target structure to use the cached values, which may increase the prediction rate success.

Various references herein to an "embodiment" are to be understood as describing a particular feature, structure, or characteristic included in at least one embodiment of the invention. Thus, the appearance of phrases such as "in one embodiment," or "in alternate an embodiment" may describe various embodiments of the invention, and may not necessarily all refer to the same embodiment.

Figure 1:
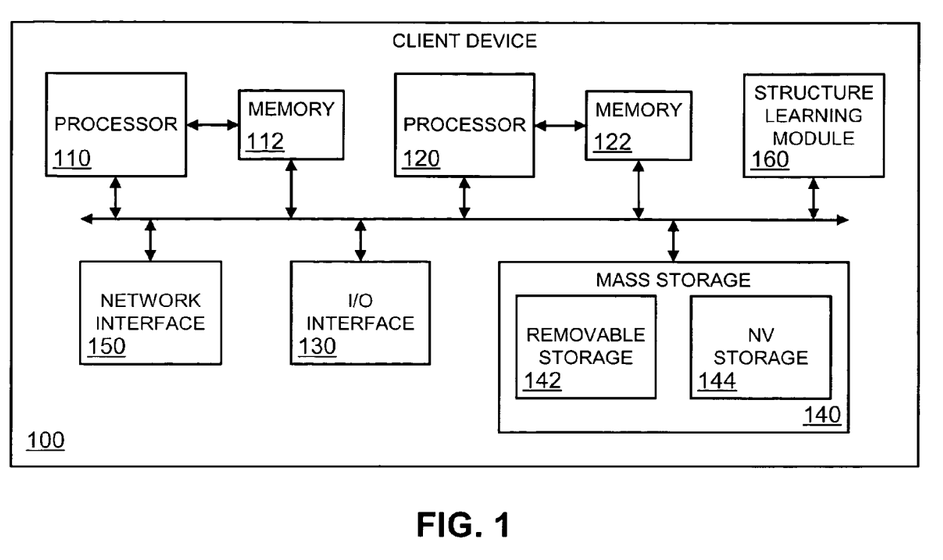
FIG. 1 is an embodiment of a block diagram of a computing device having a structure learning module.

FIG. 1 is an embodiment of a block diagram of a computing device having a structure learning module. Computing device 100 represents a computer, server, workstation, or other computing device. Computing device 100 may be multi-threading to allow simultaneous/parallel handling of different processes. Processor 110 represents one or more processing units and/or computing cores. Processor 110 may include a central processing unit, a microcontroller, a digital signal processor (DSP), etc. Processor 120 likewise represents one or more processing units and/or computing cores, and may include a central processing unit, a microcontroller, a DSP, etc. Processors 110 and 120 may operate in parallel. In one embodiment processors 110 and 120 represent parallel processing cores of computing device 100. In one embodiment computing device 100 does not include processor 120. Computing device 100 may represent a simultaneous multi-processor (SMP) system or an on-chip multi-processor (CMP) system.

Memory 112 may provide storage for temporary variables and/or instructions for execution by processor 110. Memory 112 may represent on-chip memory, for example, a cache layer on processor 110, volatile storage on a system bus of computing device 100, a system random access memory (RAM), etc. Memory 112 may be accessible directly by processor 110, accessible over a system bus, and/or a combination of these. Memory 122 may be similarly described with respect to processor 120.

In one embodiment client device includes I/O (input/output) interface 130, which represents one or more mechanisms/devices through which computing device 100 may receive input from an external source and/or provide output to an external source. An external source may include another computing system, a user, etc., and may include display devices, cursor controls, alphanumeric input devices, audio input and/or output devices, visual display (e.g., light emitting diodes (LEDs)), etc. I/O interface 130 may also include drivers for I/O devices. Information/data/instructions received through I/O interface 130 may be stored in memory 112 and/or memory 122 and/or mass storage 140. Mass storage 140 represents various storage mechanisms, including removable storage 142 (e.g., disk drives, memory sticks/cards/slots, universal serial bus (USB)-connected devices, etc.) and non-volatile storage 144 (e.g., disk drives, memory sticks/cards, slots, hard disk drives, etc.). Mass storage may store programs/application and/or instructions for loading into memories 112 and/or 122 for execution, and/or data relating to or associated with a program or instruction.

In one embodiment client device may include network interface 150, which may include a wired or wireless interface and/or both wired and wireless interfaces. Network interface 150 may represent a network card/circuit through which client device 100 may interface with a parallel computing device over a network.

In one embodiment computing device 100 includes structure learning module 160, which may represent one or more components to provide functions for structure learning of a data network. For example, structure learning module 160 may include a software and/or hardware component. Structure learning module 160 may represent a program executed by processor 110 or processor 120, or be part of a component on computing device 100. For example, an embedded system may include a structure learning processing core. Structure learning module 160 may include the functionality to pre-compute a computation result for later reuse. Pre-computing may refer to caching a result. Thus, a result may be computed as part of a computation and stored. Alternatively, the result may be computed in anticipation of being used. Structure learning module 160 may include one or more algorithms, or access to algorithms, to provide functionality to compute a node score, compute an entropy, restructure a DAG for computation, etc.

Structure learning module 160 is shown generically in computing device 100. Structure learning module 160 may be included as software, hardware and/or a combination, as data stored on mass storage 140, executing in one or both of processors 110 or 120, residing in one or both of memory 112 or 122, data to execute structure learning module 160 received over network interface 150, controlled via I/O interface 130 or an external system interfaced through I/O interface 130.

Figure 2:
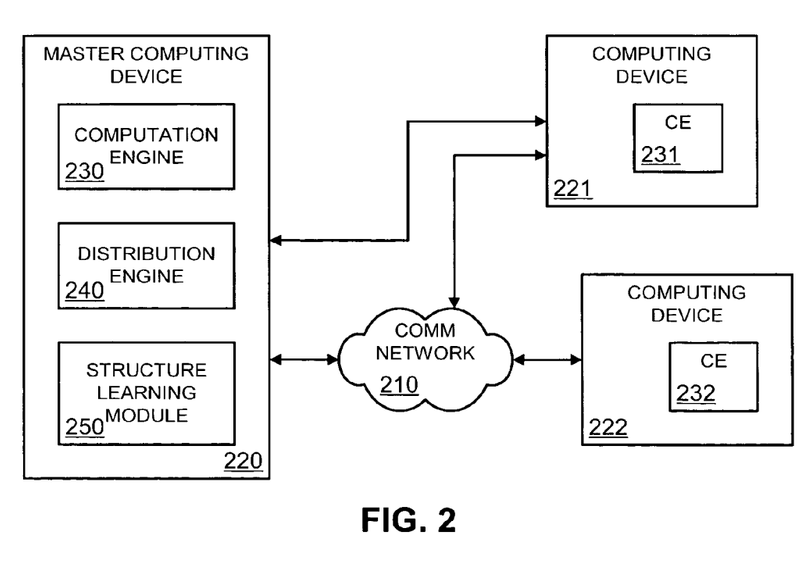
FIG. 2 is an embodiment of a block diagram of a computing device having a structure learning module interconnected with another computing device.

FIG. 2 is an embodiment of a block diagram of a computing device having a structure learning module interconnected with another computing device. One or more of computing devices 220-222 may be connected to communication (comm) network 210. In one embodiment communication network 210 represents a wide area network (WAN), e.g., the Internet, and may also represent a local area network (LAN), or other local interconnection between computers. Communication network 210 may represent a combination of a LAN and a WAN. Communication network 210, representing an interconnecting of computing devices, should not be confused herein with a data network, which may refer to a logical representation of information and internal relationships of the information.

Master computing device 220 represents a device, system, apparatus, and/or computer that manages computations of interest. For example, the computations may be associated with structure learning of a data network structure, for example, a Bayesian network. In one embodiment master computing device 220 includes computation engine 230, which may include hardware and/or software to provide the computation functions. These computation functions may include, but are not limited to, reading evidences, performing matrix calculations, performing edge differences between nodes, computing a displacement, rearranging a logical order/structure of a matrix computation, and caching a result. These functions may be shared with or performed by structure learning module 250. For example, computation engine 230 may refer to an arithmetic unit that performs computations, and other functions are performed/directed by structure learning module 250. In one embodiment structure learning module 250 includes computation engine 230.

In one embodiment master computing device 220 includes distribution engine 240 to distribute information and/or computation requests to computing devices 221 and/or 222. For example, information may include data gathered and/or results generated by computation engine 230 and/or structure learning module 250. These results may be used by computing device 221 and 222 in computing scores of nodes/DAGs in parallel with master computing device 220. Distribution engine 240 may include algorithms to determine a manner in which to distribute the information to an external entity. In one embodiment structure learning module includes distribution engine 240.

Master computing device 220 may control the flow of computations by generating computations to be performed, by distributing computations to computing device 221 and 222, by executing a program that requests a computation-intensive function, etc. In one embodiment master computing device 220 may distribute data and/or computations to computing device 221 and/or computing device 222. Computing devices 221 and 222 may include computation engines (CE) 231 and 232, respectively, to enable the computing devices to perform the computations/calculations received from master computing device 220, if any. In one embodiment computing device 221 represents a computing resource local to master computing device 220. For example, computing device 221 may be a computing core located on an apparatus local to computing device 220 and connected, for example, by a local communication line and/or communication bus. In one embodiment computing device 222 represents a computing resource remote from master computing device 220, for example, a workstation/server located over a LAN and/or a WAN.

Figure 3:
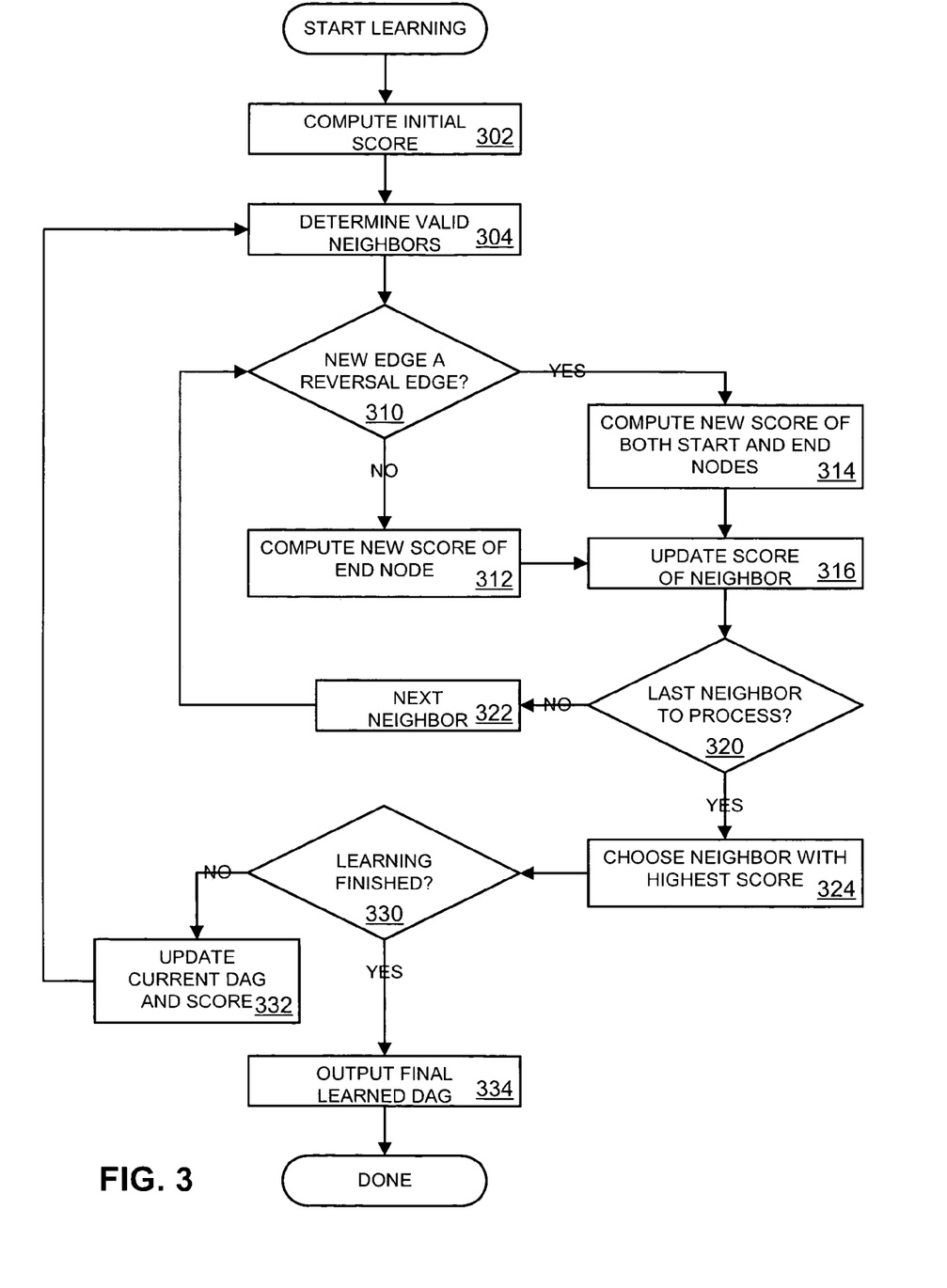
FIG. 3 is an embodiment of a flow diagram of structure learning with result reuse.

FIG. 3 is an embodiment of a flow diagram of structure learning with result reuse. Learning may be started, and an initial score computed, 302. The initial score may be computed by a processor, computing unit, computation unit, etc., of a computing device. The initial score may include a score for a network structure including various network nodes. The network structure may include a statistical relationship between the nodes. For example, the nodes may be interconnected logically (to result in the structure) by an edge that indicates a probability of the event of one node given the probability of the occurrence of the event of the other node. The structure may be constructed with reference to a target, or child, node and surrounding nodes, including neighbors. An edge establishing a causal relationship between the nodes may make a neighbor node a parent of the child. Each node may be said to exist in one or more states, which states may represent relationships to surrounding nodes. Thus, an initial score may include a calculation of the states of a starting node, which may be randomly selected, and its parents. Such a structure may be computed to determine a score, which will account for the strongest likelihood of causal relationships in the DAG among all neighbors.

The neighbors of the target node may be determined, 304. To compute the score of a node, the state of the node in relationship to other nodes may be computed. The computation of a score of the DAG may involve determining a displacement of a matrix calculation of states of the node and its neighbor nodes. In one embodiment a partial displacement of a DAG or family structure may be determined. The partial displacement may represent a calculation made for a base structure, or current structure, of the neighborhood. The current structure may be determined to be common to multiple calculations that will occur, and thus be a base structure for calculations involving the common structure with an edge difference. In one embodiment a base structure may be sought among a DAG for a family structure that will be common for calculations of scores of the DAG. The base structure may be a structure that differs by a single parent difference with respect to the target node. The base structure may or may not be the structure as it would be calculated by traditional methods. For example, a traditional method may lay a child node as the last dimension. If the child and its structure may be used for performing calculations relating to DAGs having multiple different parents of the child, the matrix calculations may in one embodiment be logically reordered, which may also in one embodiment logically restructure the family to be scored, to provide a base structure with the child in the penultimate dimension of the matrix calculations.

The computation process may proceed to perform an edge addition and/or deletion to find the score with the new structure. The process may determine if a new edge is a reversal edge, 310, meaning the edge reverses the causal relationship between two nodes. If the edge is not a reversal edge, the new score of the end node, or target node, of the new edge may be computed, 312, to compute the DAG's score. The end node is the target node for which the structure is being computed. If the edge is a reversal edge, the new score of both the end node and the start node may be computed, 314. If an edge is a reversal edge, the parent becomes the child and the child becomes the parent. The score of the neighbor may be updated after computation of the new structure, 316.

If the neighbor processed was not the last neighbor to process, 320, the next neighbor is obtained, 322. In one embodiment an intermediate result of a computation for the scoring performed with respect to the new edge, in 310-316, may be stored for future use. It may be speculated that the value may be reused in calculations for other nodes. Thus, the structure of the family need not be recomputed to determine the score for the parent node of a next neighbor. If the neighbor processed was the last neighbor, the neighbor with the highest score may be sought, 324. The neighbor with the highest score may be the new target structure, or current structure for structure learning against which to compare on a further iteration to determine the "best structure." If the learning is finished, meaning no further iterations will occur, the final learned DAG may be output as the resulting structure, 334. If the learning is not finished, meaning a condition has not occurred to end the learning (e.g., the target node is the same for a threshold number of iterations, a threshold number of calculations have been performed, a stop indication is received, a threshold number of nodes have been searched, etc.), the current DAG and DAG score may be updated, 332, and a next iteration started. Again, a stored speculative family structure displacement value may be reused with respect to the next iteration, if the family encountered is similar in structure.

Figure 4:
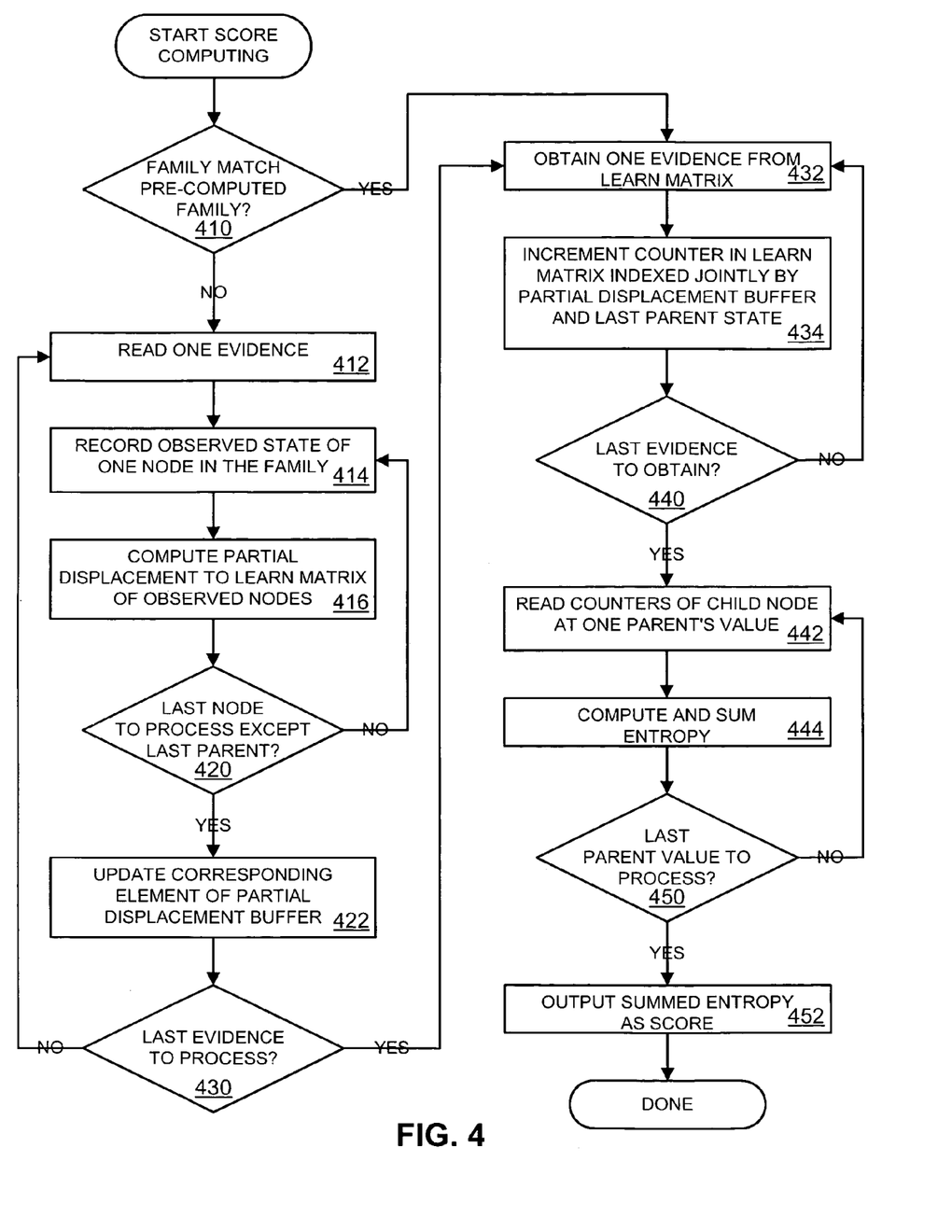
FIG. 4 is an embodiment of a flow diagram of score computing with result reuse.

FIG. 4 is an embodiment of a flow diagram of score computing with result reuse. A structure of a family to be scored is matched against a structure of a family for which an intermediate result is stored, 410, or a previous family structure. The intermediate result may be a partial displacement value for the previous family structure, or for part of the previous family structure. In one embodiment values associated with multiple families may be cached for reuse, and may be indexed by a family identifier. If the family is found to match, many computations may be avoided, and the value reloaded to use in scoring the new family.

If the family does not match, an evidence is read, 412. The evidence may be used in filling a matrix. The evidence may include an observed state of one node in the family, which may be recorded for use in score computations, 414. A partial displacement of the structure may be computed to learn the matrix of the observed nodes, 416. The partial displacement may be an intermediate calculation result associated with a particular family structure, which may be speculatively saved for reuse. The partial displacement may then be used to compute the score of a node of the family neighborhood.

If the node for which the computation is performed is the last node to process except the last parent, 420, the corresponding element of the partial displacement buffer may be updated, 422. In one embodiment the matrix is filled up to a penultimate dimension, and the partial displacement may be computed as an intermediate result to be used in multiple computations. If the node is not the last node, the state of another node in the family may be observed to include all but the last parent node.

The process/algorithm determines if the evidences have all been processed, 430. If they have not all been processed, more evidences may be read and the learn matrix filled according to observations of the nodes as set forth above. If all evidences to be processed have been processed, or if the family to be processed matches the pre-computed family, an evidence is obtained from the learn matrix, 432. That is, the learn matrix may be processed for computation, and the information placed in the matrix to be computed is obtained. The counter in the learn matrix indexed by the partial displacement buffer and the last parent state may be incremented, 434. If the last evidence has not been obtained (re-read), 440, the next evidence may be obtained.

If the last evidence has been obtained, the counters indicating the child node at one parent's state value is read, 442. From these values, the score of the node may be computed and summed to the entropy of the DAG and/or the node, 444. This process may continue iteratively until the last parent value is processed, 450. Once the process is completed, the entropy may be output as the score, 452.

Figure 5:
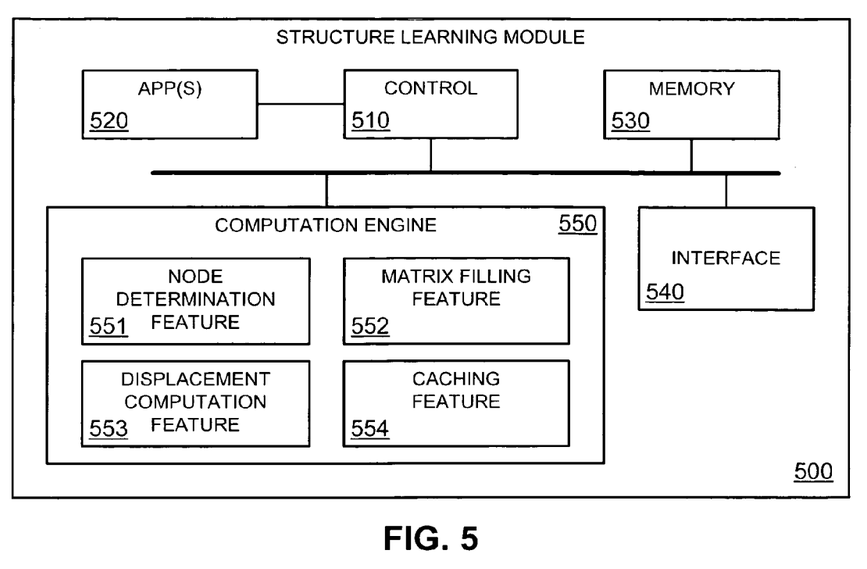
FIG. 5 is an embodiment of a block diagram of a structure learning module.

FIG. 5 is an embodiment of a block diagram of a structure learning module. Structure learning module 500 represents a circuit, a combination of logic, firmware or group/series of instructions for execution on a computation/logic device, a subsystem, or a virtual subsystem that is configured, enabled, or otherwise able to perform operations related to integration of authentication and policy enforcement services. Control logic 510 directs the flow of operation of module 500. In one embodiment, control logic 510 is a series of software/firmware instructions to perform logic operations. In another embodiment, control logic 510 can be implemented by hardware control logic, or a combination of hardware-based control logic and software instructions.

Interface 540 provides a communications interface between module 500 and an external electronic system (not shown) and/or network. For example, module 500 as part of a host computing system may have interface 540 to provide a communication interface between module 500 and the host computing system via a system bus. In one embodiment interface 540 includes a communication path to a network. For example, interface 540 may include an interface to an Ethernet, Internet, wireless communication channel, etc.

Module 500 may include one or more applications 520. Application 520 represents one or more programs and/or other series of instruction sequences that are executed on control logic 510. In one embodiment module 500 may execute part of all of a user application or a system application. Application 520 may provide instructions to control logic 510 to cause module 500 to perform operations. Instructions may also be provided to control logic 510 by memory 530. For example, control logic 510 may access, or read a portion of memory 530 to obtain instructions to perform a series of operations and/or data for use with operations. Thus, control logic 510 can receive one or more instructions from internal application software running locally on compliance module 500, such as application 520, from memory 530, and/or from external applications, storage media, etc., through interface 540.

Module 500 includes computation engine 550. In one embodiment module 500 may perform operations including reading evidences, performing matrix calculations, performing edge differences between nodes, computing a displacement, rearranging a logical order/structure of a matrix computation, and caching a result. Computation engine 550 is shown with various features, which represent functions or features that computation engine 550 may provide. Each function or feature is provided through performing one or more operations. Computation engine 550 may include one or more of: node determination feature 551, matrix filling feature 552, displacement computation feature 553, and caching feature 554. In one embodiment one or more of these features may exist independently of and/or be external to module 500. Thus, computation engine 550 may be more complex or less complex, containing some, all, or additional features to those represented in FIG. 5.

Node determination feature 551 enables module 500 to determine a family structure for scoring in structure learning. This may include determining a current structure and comparing a current family structure against a previously computed family. Node determination feature 551 may include the capability to determine that a network neighborhood structure differs from a previously computed structure by a single parent with respect to a child node. Node determination feature 551 in one embodiment includes the functionality to reorder a family structure to lay a child node at a penultimate dimension of a learn matrix.

Matrix filling feature 552 enables module 500 to perform functions related to determining values to use in a matrix calculation. For example, matrix filling feature 552 may include the functions of reading evidences, recording observed states nodes, managing buffer and or matrix pointers and/or counter, and ordering data for a partial displacement calculation.

Displacement computation feature 553 enables module 500 to determine a displacement or other intermediate calculation value. The intermediate calculation value may be stored for reuse in scoring other nodes. A final displacement may be computed by performing matrix computations on a filled learn matrix and/or by using an intermediate calculation value with a value of a state representing the last dimension of a learn matrix.

Caching feature 554 enables module 500 to store displacement results and/or other intermediate calculation results for reuse. A speculation algorithm may determine whether a value should be stored. Alternatively, every displacement result may be stored. In one embodiment multiple values are simultaneously cached, and each has an index that may be invoked to reload the particular value of interest. The values stored may be periodically removed, for example, after a period of non-use. The values may be stored for a period of time and then removed. Because storage of intermediate results may result in large amounts of stored information, especially as the size and complexity of DAGs to be considered increase, and the access of stored values result in a performance penalty (computations and/or access latency), values stored may be periodically removed to preserve a manageable amount of cached information and a manageable amount of information to search for a matching structure.

In one embodiment module 500 is implemented with firmware, software, or a combination of firmware and software. Module 500 may be implemented in hardware and/or a combination of hardware and software and/or firmware. The software and/or firmware content may provide instructions to cause executing hardware to perform various operations, including some or all of the functions/features described above. Instructions that may cause/result in the performing of functions/operations described herein may be received via an article of manufacture by a machine/electronic device/hardware and performed by/on the machine. An article of manufacture may include a machine accessible/readable medium having content to provide the instructions. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above.

Figure 6A:
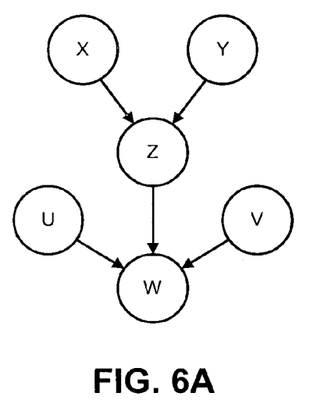
FIG. 6A is an embodiment of a block diagram of a directed acyclic graph.

FIG. 6A is an embodiment of a block diagram of a directed acyclic graph (DAG). In one embodiment the neighborhood of FIG. 6A represents a DAG to be scored in a structure learning sequence or iteration. A child node W may be considered in the DAG with parents U, V, and Z, and other nodes in the neighborhood X and Y. In one embodiment the structure may be a base structure for which a displacement will be stored. The displacement of the DAG of FIG. 6A may be a partial displacement of another DAG. A computation of the structure of the DAG may be reusable in the computation of additional DAGs with partially identical structure. Partially identical structure may refer to a structure that has a common base structure and differs by a parent. In one embodiment the commonality of structure between a family according to the structure of FIG. 6A may provide for the reuse of a score computation of the DAG and/or an intermediate computation of the DAG.

Figure 6B:
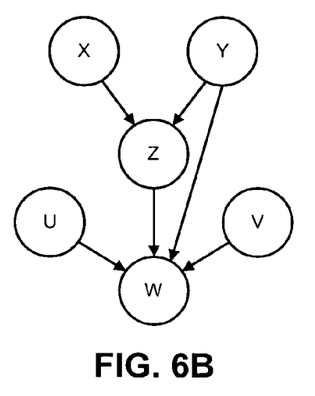
FIG. 6B is an embodiment of a block diagram of a directed acyclic graph.

FIG. 6B is an embodiment of a block diagram of a directed acyclic graph (DAG). This may be an example of a DAG structure for which the DAG of FIG. 6A is a base structure. In one embodiment the DAG of FIG. 6B may be considered to be a neighbor of the DAG of FIG. 6A in that the two structures differ by an edge (Y to W). Thus, calculation of the score of this structure may be performed by reloading a score for FIG. 6A, with the target node W as the penultimate dimension of the learn matrix, and the state represented by the edge of Y to W be added to perform the calculation. Thus, the learn matrix of the structure of FIG. 6A may be leveraged to provide the learn matrix for the structure of FIG. 6B, with the edge difference noted.

Note that the computation of the structure of FIG. 6A may occur a relatively long amount of time (many execution cycles) prior to the computation of the structure of FIG. 6B. In one embodiment it may be simple to store and access for reuse the value of a computation of the Figure of 6A. This may be simple based on an amount of memory usable to store intermediate results, the number of intermediate results to be stored, and/or the simplicity or relative complexity with which a stored result may be reloaded. A caching and reloading penalty may be incurred with storing intermediate results for reuse. If the penalty associated with one or more of the factors exceeds the benefits gained by saving the calculations to build the learn matrix, it may be impractical to use a cache and reload and described herein. Thus, in one embodiment how long prior to computation of a new structure (for example, FIG. 6B) the computation of a previously computed structure (for example, FIG. 6A) occurred may make a difference in whether the value of the previously computed structure will be used as an intermediate result to compute the structure value of the new structure. In one embodiment the length of time may be several iterations.

Figure 6C:
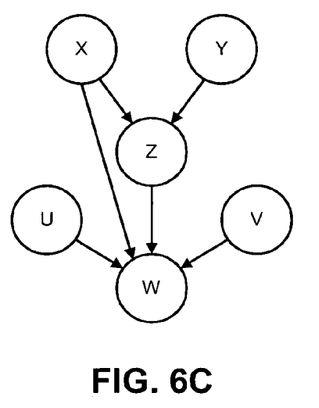
FIG. 6C is an embodiment of a block diagram of a directed acyclic graph.

FIG. 6C is an embodiment of a block diagram of a directed acyclic graph (DAG). This structure may be an example of a DAG for which the DAG of FIG. 6A and/or the DAG of FIG. 6B is a base structure. In one embodiment the DAG of FIG. 6C may be considered to be a neighbor of the DAG of FIG. 6A in that the two structures differ by an edge (X to W). Thus, a partial displacement of the structure of FIG. 6A may be re-loaded to calculate the score of FIG. 6C, with the edge difference of the edge between neighbor X as a new parent of W. Additionally, note that the DAG of FIG. 6C differs by only one parent difference with respect to node W. That is, in FIG. 6B node W has four parents (U, V, Z, and Y) and in FIG. 6C node W has four parents (U, V, Z, and X). Thus, a partial displacement of the structure of FIG. 6B up to and excluding node Y may be used as a partial displacement in computing the score of the structure in FIG. 6C. The partial displacement of FIG. 6B may be stored and recalled to use in computing the structure of FIG. 6C, with the addition of the parent X.

Figure 7:
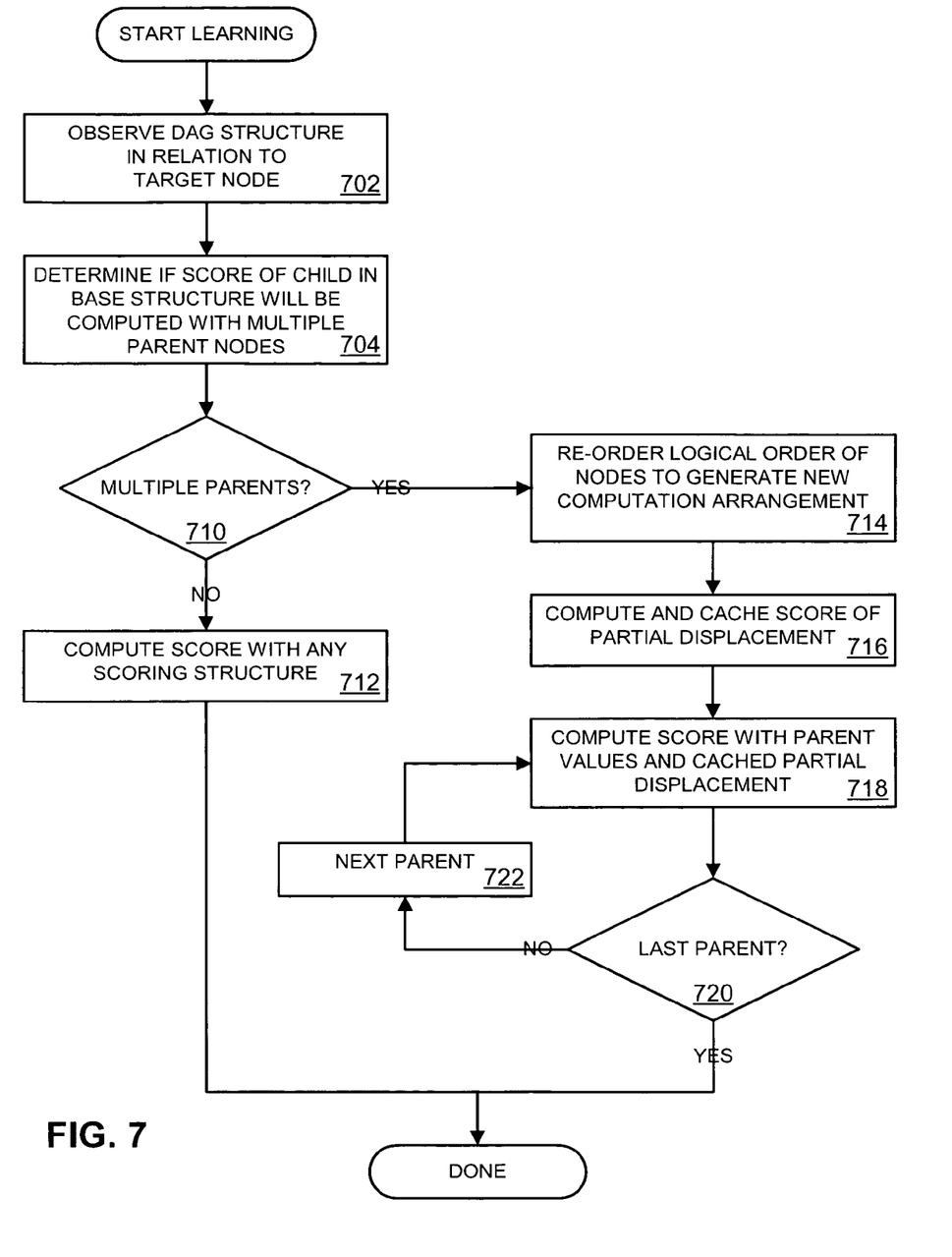
FIG. 7 is an embodiment of a flow diagram of structure learning with structure re-ordering.

FIG. 7 is an embodiment of a flow diagram of structure learning with structure re-ordering. The structure of a DAG may be observed in relation to a target node, 702. This may involve speculating that a node structure may be reused for the scoring of other nodes. In one embodiment the DAG structure observed may result in a computation algorithm setting the target node as the last dimension in a learn matrix. The speculation may determine if the score of the base DAG structure for the child (target) node will be the same for a learn matrix for multiple parent nodes of the child, 704. If multiple parents are not predicted to be present, 710, the score may be computed with any scoring structure, having the nodes in any order in the learn matrix, according to the computation algorithm, 712. If multiple parents are predicted, 710, the logical order of the nodes may be re-ordered to generate a new computation arrangement with respect to the learn matrix, 714. The re-ordering may include placing the child node as the next to last dimension of the learn matrix to provide locality advantages in calculations. In one embodiment all structures are re-ordered with the child node at the penultimate dimension. In such an implementation, all intermediate results of DAG scoring of the displacement up to and excluding the last parent node may be saved for speculated or hoped-for reuse.

The score of the displacement may be computed and cached, 716. In one embodiment, all displacement values are cached for speculated reuse. The displacement may be used as a partial displacement of a structure having common nodes with a parent difference. The score of a node is computed with the parent state values and the cached partial displacement, 718. If the parent is not the last parent to have the common base structure, 720, the next parent with the common base structure is determined, 722, and the partial displacement value may be recalled and used in conjunction with the state values of the next parent.

Besides what is described herein, various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method for score computing of a Bayesian network, comprising:
   receiving, at a structure learning module included in a computing device, a request for a current best structure, the request to include a network neighborhood structure further including a data set of statistical computing information represented as a directed acyclic graph (DAG) with a family structure, where the family structure includes nodes that each represent an observed state, and statistical relationships between nodes in the family structure;
   computing an intermediate result for a score computation of the family structure of the Bayesian network including a child node, the score computation for structure learning of the Bayesian network, the intermediate result being a score of the family structure resulting from the score computation of the family structure including the child node;
   caching the intermediate result in a memory device;
   changing a single edge in the family structure by making a single edge difference between a parent node of the family structure and the child node, wherein the single edge represents a logical relationship between the Parent node and the child node;
   computing a score of the family structure with the changed single edge using the intermediate result and the single edge difference;
   comparing the score of the family structure with the changed single edge with a score of another computation of the family structure to determine a higher scoring structure; and
   outputting the higher scoring structure as a current best structure from the structure learning module.

2. A method according to claim 1, wherein computing the intermediate result comprises computing the score prior to performing a structure learning process to learn the structure of the Bayesian network.

3. A method according to claim 1, wherein learning the structure of the Bayesian network comprises executing a hill-climbing algorithm.

4. A method according to claim 1, wherein computing the intermediate result comprises calculating a partial displacement value of the family structure.

5. A method according to claim 4, wherein the partial displacement value comprises a displacement value of a family structure including the child node and excluding the parent node.

6. A method according to claim 4, wherein computing the score of the family structure with the edge difference comprises computing the displacement value of the family structure including the child node and the parent node.

7. A method according to claim , further comprising:
   distributing the cached intermediate result among multiple computing components.

8. A method according to claim 7, wherein the multiple computing components comprise a single computing device.

9. A method according to claim 7, wherein the multiple computing components are interconnected with a communication link.

10. A method according to claim 1, wherein receiving the data set of statistical computing information comprises receiving a data set related to bioinformatics or structure learning.

11. A method according to claim 1, wherein receiving the data set of statistical computing information comprises receiving a data set related to bioinformatics or structure learning.

12. An article of manufacture comprising a machine accessible medium having content to provide instructions to result in a machine performing operations including:
receiving, at a structure learning module included in a computing device, a request for a current best structure, the request to include a network neighborhood structure further including a data set of statistical computing information represented as a directed acyclic graph (DAG) with a family structure, where the family structure includes nodes that each represent an observed state, and statistical relationships between nodes in the family structure;
computing an intermediate result for a score computation of the family structure of the Bayesian network including a child node, the score computation for structure learning of the Bayesian network, the intermediate result being a score of the family structure resulting from the score computation of the family structure including the child node;
caching the intermediate result in a memory device;
changing a single edge in the family structure by making a single edge difference between a parent node of the family structure and the child node, wherein the single edge represents a logical relationship between the parent node and the child node;
computing a score of the family structure with the changed single edge using the intermediate result and the single edge difference;
comparing the score of the family structure with the changed single edge with a score of another computation of the family structure to determine a higher scoring structure; and
outputting the higher scoring structure as a current best structure from the structure learning module.

13. An article of manufacture according to claim 12, wherein the content to provide instructions to result in the machine computing the intermediate result comprises the content to provide instructions to result in the machine calculating a partial displacement value of the family structure, the partial displacement value including the child node and excluding the parent node.

14. An article of manufacture according to claim 13, wherein the content to provide instructions to result in the machine computing the score of the family structure with the edge difference comprises the content to provide instructions to result in the machine computing the displacement value of the family structure including the child node and the parent node.

15. An article of manufacture according to claim 12, further comprising the content to provide instructions to result in a computing device distributing the cached result to a different computing device.

16. An apparatus to perform directed graph structure learning, comprising:
a processor to execute instructions; and
a structure learning module coupled to the processor having data to provide instructions to the processor to result in the processor performing operations including
receiving, at the structure learning module, a request from a computing device for a current best structure, the request to include a Bayesian network neighborhood structure further including a data set of statistical computing information represented as a directed acyclic graph (DAG) with a family structure, where the family structure includes nodes that each represent an observed state, and statistical relationships between nodes in the family structure;
calculating a matrix displacement offset of the Bayesian network neighborhood, the Bayesian network neighborhood including a child node, matrix displacement offset excluding a first parent node of the Bayesian network neighborhood;
storing the matrix displacement offset in a memory;
retrieving the matrix displacement offset from the memory to calculate a displacement result of the Bayesian network neighborhood including the child node and a second parent node to generate a structure score of the Bayesian network neighborhood for the directed graph structure learning, the displacement result calculated from the retrieved matrix displacement offset and the value of the second parent node;
comparing the structure score with another score calculated for the Bayesian network neighborhood to determine a higher scoring structure; and
outputting the higher scoring structure as a current best structure from the structure learning module to the computing device.

17. An apparatus according to claim 16, the memory further having data to provide instructions to the processor to result in the processor indicating the matrix displacement offset to a computing core.

18. An apparatus according to claim 17, wherein the computing core comprises an additional processor, coupled to the memory, to execute instructions, and to receive the matrix displacement offset from the processor.

19. An apparatus according to claim 17, wherein the computing core comprises a computing core on a remote computing device.

20. A computer-implemented method for score computing in network structure learning, comprising:
receiving, at a structure learning module included in a computing device, a request for a current best structure, the request to include a network neighborhood structure further including a data set of statistical computing information represented as a directed acyclic graph (DAG) with a family structure, where the family structure includes nodes that each represent an observed state, and statistical relationships between nodes in the family, structure;
preparing a score computation of the network neighborhood structure, the score computation having a logical computation order with a child node as the last dimension of the logical computation order;
speculating the network structure has a single edge difference compared to a previously computed network neighborhood structure, wherein the single edge represents a logical relationship between the parent node and the child node of the previously computed network neighborhood structure;
re-ordering the logical computation order of the score computation to compute the score computation of the network neighborhood structure with the child node as the penultimate dimension and a parent node of the child node as the last dimension to obtain a score result of the network neighborhood for the network structure learning;

comparing the computed score computation of the network neighborhood structure with the child node as the penultimate dimension and the parent node of the child node as the last dimension with a score of another computation of the network neighborhood structure to determine a higher scoring structure; and outputting the higher scoring structure as a current best structure from the structure learning module.

21. A method according to claim 20, wherein the neighborhood structure comprises a Bayesian network.

22. A method according to claim 20, wherein the previously computed network neighborhood structure comprises a last computed network neighborhood structure.

23. A method according to claim 20, further comprising computing and storing a partial displacement value, the partial displacement comprising a score computation according to the re-ordered logical computation order of the neighborhood structure including the state values of all dimensions up to and including the penultimate dimension, and excluding the last dimension.

24. An article of manufacture comprising a machine accessible medium having content that when accessed results in a machine performing operations including:

receiving, at a structure learning module, a request from a computing device for a current best structure, the request to include a network neighborhood structure further including a data set of statistical computing information represented as a directed acyclic graph (DAG) with a family structure, where the family structure includes nodes that each represent an observed state, and statistical relationships between nodes in the family structure;

preparing a score computation of the network neighborhood structure, the score computation having a logical computation order with a child node as the last dimension of the logical computation order;

speculating the network structure has a single edge difference compared to a previously computed network neighborhood structure, wherein the single edge represents a logical relationship between the parent node and the child node of the previously computed network neighborhood structure;

re-ordering the logical computation order of the score computation to compute the score computation of the network neighborhood structure with the child node as the penultimate dimension and a parent node of the child node as the last dimension to obtain a score result of the network neighborhood for the network structure learning;

comparing the computed score computation of the network neighborhood structure with the child node as the penultimate dimension and the parent node of the child node as the last dimension with a score of another computation of the network neighborhood structure to determine a higher scoring structure; and outputting the higher scoring structure as a current best structure from the structure learning module to the computing device.

25. An article of manufacture according to claim 24, wherein the neighborhood structure comprises a Bayesian network.

26. An article of manufacture according to claim 24, wherein the previously computed network neighborhood structure comprises a most recently computed network neighborhood structure.

27. An article of manufacture according to claim 24, the content when accessed further results in the machine computing and storing a partial displacement value, the partial displacement comprising a score computation according to the re-ordered logical computation order of the neighborhood structure including the state values of all dimensions up to and including the penultimate dimension, and excluding the last dimension.

28. An apparatus to perform Bayesian network structure learning, comprising:

a processor to execute instructions;

a structure learning module coupled to the processor having data to provide instructions to the processor to result in the processor performing operations including receiving, at a structure learning module, a request from a computing device for a current best structure, the request to include a network neighborhood structure further including a data set of statistical computing information represented as a directed acyclic graph (DAG) with a family structure, where the family structure includes nodes that each represent an observed state, and statistical relationships between nodes in the family structure;

preparing a statistical score computation of the network neighborhood structure, the score computation having a logical computation order with a child node as the last dimension of the logical computation order;

speculating the network structure has a single edge difference with respect to a most recently scored network neighborhood structure, wherein the single edge represents a logical relationship between the parent node and the child node of the most recently scored network neighborhood structure;

re-ordering the logical computation order of the score computation to compute the score computation of the network neighborhood structure with the child node as the penultimate dimension and a parent node of the child node as the last dimension;

caching a score computation result according to the re-ordered logical computation order for state values of the neighborhood structure up to and including the child node, and excluding the parent node;

comparing the score computation result according to the re-ordered logical computation order with a score of another computation of the network neighborhood structure to determine a higher scoring structure; and outputting the higher scoring structure as a current best structure from the structure learning module to the computing device; and a communication interface coupled with an external computing device to transmit the cached score computation result to the external computing device.

29. An apparatus according to claim 28, wherein caching the score computation result further comprises speculating that the score computation result will be re-used in other score computations.

30. An apparatus according to claim 28, wherein the communication interface comprises a system bus of a multi-core system, and wherein the external computing device comprises an additional core of the system.

* * * * *